United States Patent
Nishiguchi et al.

(10) Patent No.: US 9,611,370 B2
(45) Date of Patent: Apr. 4, 2017

(54) LOW-RESILIENCE POLYURETHANE FOAM AND PRODUCTION METHOD THEREOF

(71) Applicant: MITSUI CHEMICALS, INC., Tokyo (JP)

(72) Inventors: Daisuke Nishiguchi, Sakai (JP); Masakazu Kageoka, Kawasaki (JP); Toshiaki Moriya, Sagamihara (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 35 days.

(21) Appl. No.: 14/775,367

(22) PCT Filed: Mar. 15, 2013

(86) PCT No.: PCT/JP2013/057499
§ 371 (c)(1),
(2) Date: Sep. 11, 2015

(87) PCT Pub. No.: WO2014/141475
PCT Pub. Date: Sep. 18, 2014

(65) Prior Publication Data
US 2016/0024268 A1    Jan. 28, 2016

(51) Int. Cl.
*C08J 9/00* (2006.01)
*C08G 18/00* (2006.01)
*C08G 18/48* (2006.01)
*C08J 9/12* (2006.01)
*C08G 18/66* (2006.01)
*C08G 18/18* (2006.01)
*C08G 18/26* (2006.01)
*C08G 18/75* (2006.01)
*C08G 101/00* (2006.01)

(52) U.S. Cl.
CPC .......... *C08J 9/125* (2013.01); *C08G 18/1808* (2013.01); *C08G 18/1833* (2013.01); *C08G 18/26* (2013.01); *C08G 18/4837* (2013.01); *C08G 18/6688* (2013.01); *C08G 18/757* (2013.01); *C08J 9/0028* (2013.01); *C08G 2101/00* (2013.01); *C08J 2375/08* (2013.01)

(58) Field of Classification Search
CPC ........ C08J 9/0028; C08J 9/00; C08J 2375/08; C08G 18/00; C08G 18/4845; C08G 18/1808; C08G 18/757; C08G 2101/00
See application file for complete search history.

(56) References Cited

U.S. PATENT DOCUMENTS

| | | |
|---|---|---|
| 6,204,300 B1 | 3/2001 | Kumaki |
| 2009/0005467 A1 | 1/2009 | Moriya |
| 2010/0216905 A1 | 8/2010 | Kuwamura |
| 2010/0227985 A1 | 9/2010 | Nishiguchi |
| 2010/0305294 A1 | 12/2010 | Utsumi |
| 2013/0324631 A1 | 12/2013 | Kuwamura |
| 2014/0024797 A1 | 1/2014 | Ootsuki |
| 2015/0291758 A1 | 10/2015 | Kuwamura |

FOREIGN PATENT DOCUMENTS

| | | | |
|---|---|---|---|
| JP | 9302066 A2 | 11/1997 | |
| JP | 11286566 A2 | 10/1999 | |
| JP | 200189547 | 4/2001 | |
| JP | 2001089547 A2 | 4/2001 | |
| JP | 2003048937 A2 | 2/2003 | |
| JP | 2004231899 A2 | 8/2004 | |
| JP | 200663254 | 3/2006 | |
| JP | 2011140618 A2 | 7/2011 | |
| JP | 2013076076 A2 | 4/2013 | |
| TW | 200728339 A | 8/2007 | |
| TW | 200927779 A | 7/2009 | |
| WO | 2007077792 A1 | 7/2007 | |
| WO | WO 2009/051114 | * 4/2009 | ............ C08G 18/75 |

OTHER PUBLICATIONS

International Search Report dated Jun. 11, 2013 filed in PCT/JP2013/057499.

* cited by examiner

*Primary Examiner* — Kara Boyle
(74) *Attorney, Agent, or Firm* — Rankin, Hill & Clark LLP

(57) ABSTRACT

A low-resilience polyurethane foam is produced by allowing a low-resilience polyurethane foam composition containing polyisocyanate (a), polyol (b), catalyst (c), and blowing agent (d) to react. The polyisocyanate (a) contains bis(isocyanatomethyl)cyclohexane, and the polyol (b) contains 5 to 30 mass % of polyol (b-1) having an average functionality of 1.5 to 4.5 and a hydroxyl number of 20 to 70 mgKOH/g, and 70 to 95 mass % of polyol (b-2) having an average functionality of 1.5 to 4.5 and a hydroxyl number of 140 to 300 mgKOH/g.

5 Claims, No Drawings

LOW-RESILIENCE POLYURETHANE FOAM AND PRODUCTION METHOD THEREOF

TECHNICAL FIELD

The present invention relates to a low-resilience polyurethane foam and a production method thereof. In particular, the present invention relates to a low-resilience polyurethane foam suitably used as a low-resilience elastomer and a production method thereof.

BACKGROUND ART

Conventionally, a low-resilience polyurethane foam has been used as a low-resilience elastomer that requires low-resilience, including a shock absorbing material, a sound absorbing material, a vibration absorbing material, a cushioning material, and a mattress material.

Patent Document 1 below has proposed, for example, a low-resilience polyurethane foam produced by allowing a urethane foam composition containing polyol (a), polyisocyanate (b), catalyst (c), and blowing agent (d) to react.

In the low-resilience polyurethane foam proposed in Patent Document 1, polyol (a) contains polyol (a-1) having an average functionality of 1.5 to 4.5 and a hydroxyl number of 20 to 70 mgKOH/g and polyol (a-2) having an average functionality of 1.5 to 4.5 and a hydroxyl number of 140 to 300 mgKOH/g, and polyol (a) has a polyol (a-1) content in the range of 32 to 80 wt % and a polyol (a-2) content in the range of 20 to 68 wt %.

In the low-resilience polyurethane foam proposed in Patent Document 1, toluenediisocyanate is used as polyisocyanate (b) in Examples.

CITATION LIST

Patent Document

Patent Document 1 WO 2007/077792

SUMMARY OF THE INVENTION

Problem to be Solved by the Invention

However, recently, depending on its purpose and applications, excellent resistant to discoloration and air permeability are required for low-resilience polyurethane foam in addition to the above-described excellent low-resilience.

An object of the present invention is to provide a low-resilience polyurethane foam having excellent low-resilience, and furthermore, excellent resistant to discoloration and air permeability; and a production method thereof.

Means for Solving the Problem

A low-resilience polyurethane foam of the present invention is produced by allowing a low-resilience polyurethane foam composition containing polyisocyanate (a), polyol (b), catalyst (c), and blowing agent (d) to react,
wherein the polyisocyanate (a) contains bis(isocyanatomethyl)cyclohexane, and
the polyol (b) contains,
5 to 30 mass % of polyol (b-1) having an average functionality of 1.5 to 4.5 and a hydroxyl number of 20 to 70 mgKOH/g, and
70 to 95 mass % of polyol (b-2) having an average functionality of 1.5 to 4.5 and a hydroxyl number of 140 to 300 mgKOH/g.

In the low-resilience polyurethane foam of the present invention, it is preferable that the polyol (b-2) is polyoxyalkylene polyol containing 10 mass % or more of oxyethylene unit and 90 mass % or less of oxypropylene unit.

In the low-resilience polyurethane foam of the present invention, it is preferable that the low-resilience polyurethane foam composition further contains cross-linking agent (e), and the cross-linking agent (e) includes alkanolamine.

In the low-resilience polyurethane foam of the present invention, it is preferable that the alkanolamine includes triisopropanolamine.

In the low-resilience polyurethane foam of the present invention, it is preferable that the bis(isocyanatomethyl)cyclohexane contains cis-1,4-bis(isocyanatomethyl)cyclohexane and trans-1,4-bis(isocyanatomethyl)cyclohexane, and the bis(isocyanatomethyl)cyclohexane contains 80 mol % or more and 93 mol % or less of the trans-1,4-bis(isocyanatomethyl)cyclohexane.

A method for producing a low-resilience polyurethane foam of the present invention includes
allowing a low-resilience polyurethane foam composition containing polyisocyanate (a), polyol (b), catalyst (c), and blowing agent (d) to react and foam,
wherein the polyisocyanate (a) contains bis(isocyanatomethyl)cyclohexane, and
the polyol (b) contains
5 to 30 mass % of polyol (b-1) having an average functionality of 1.5 to 4.5 and a hydroxyl number of 20 to 70 mgKOH/g, and
70 to 95 mass % of polyol (b-2) having an average functionality of 1.5 to 4.5 and a hydroxyl number of 140 to 300 mgKOH/g.

Effect of the Invention

A low-resilience polyurethane foam of the present invention produced by a method for producing a low-resilience polyurethane foam of the present invention has excellent low-resilience, and furthermore, excellent resistant to discoloration and excellent air permeability.

Thus, the low-resilience polyurethane foam of the present invention can be effectively used as a low-resilience elastomer for, for example, a shock absorbing material, a sound absorbing material, a vibration absorbing material, and a body pressure relieving material.

Embodiment of the Invention

A low-resilience polyurethane foam of the present invention produced by a method for producing a low-resilience polyurethane foam of the present invention is produced by allowing a low-resilience polyurethane foam composition containing polyisocyanate (a), polyol (b), catalyst (c), and blowing agent (d) to react.

The polyisocyanate (a) contains bis(isocyanatomethyl)cyclohexane (hydrogenated xylylenediisocyanate, $H_6XDI$, hereinafter referred to as BIC).

Examples of the BIC include 1,4-BIC and 1,3-BIC.

For the BIC, for example, 1,4-BIC can be used singly, 1,3-BIC can be used singly, or 1,4-BIC and 1,3-BIC can be used in combination, and preferably, the BIC contains at least 1,4-BIC, even more preferably, 1,4-BIC is used singly.

Use of 1,4-BIC improves air permeability of the low-resilience polyurethane foam.

1,4-BIC includes geometric isomers of cis-1,4-BIC and trans-1,4-BIC, and 1,4-BIC contains, for example, 50 mol % or more, preferably 70 mol % or more, more preferably 75 mol % or more, even more preferably 80 mol % or more, and for example, 96 mol % or less, preferably 93 mol % or less of trans-1,4-BIC. Furthermore, 1,4-BIC can contain, for example, 90 mol % or more of trans-1,4-BIC.

1,4-BIC having a trans-1,4-BIC content of the above-described lower limit or more can improve air permeability. Meanwhile, 1,4-BIC having a trans-1,4-BIC content of the above-described upper limit or less can suppress decrease in the number of cells per unit area and prevent coarsening of the cell diameter.

1,4-BIC is prepared in conformity with, for example, WO2009/051114 and Japanese Unexamined Patent Publication No. 2011-140618. 1,4-BIC can also be produced by, for example, using a commercially available amine or amine produced by the method described in Japanese Unexamined Patent Publication No. 2011-6382, with cold/hot two-stage process (direct method) or a salt-forming process described in Japanese Unexamined Patent Publication No. H7-309827, or non-phosgene method described in Japanese Unexamined Patent Publication No. 2004-244349 and Japanese Unexamined Patent Publication No. 2003-212835.

The polyisocyanate (a) containing the above-described BIC improves air permeability and resistant to discoloration of the low-resilience polyurethane foam.

The polyisocyanate (a) can further contain an additional polyisocyanate other than BIC.

The additional polyisocyanate is optionally used in combination with the above-described BIC, and for example, an alicyclic polyisocyanate, an aliphatic polyisocyanate, an aralkyl polyisocyanate, and an aromatic polyisocyanate other than BIC are used.

Examples of the alicyclic polyisocyanate include alicyclic diisocyanates such as 3-isocyanatomethyl-3,5,5-trimethylcyclohexyl isocyanate (isophoron diisocyanate, IPDI), 4,4'-, 2,4'- or 2,2'-dicyclohexylmethane diisocyanate or a mixture thereof ($H_{12}$MDI), 2,5- or 2,6-bis(isocyanatomethyl)norbornane or a mixture thereof (NBDI), 1,3-cyclopentane diisocyanate, 1,4-cyclohexane diisocyanate, 1,3-cyclohexane diisocyanate, methyl-2,4-cyclohexane diisocyanate, and methyl-2,6-cyclohexane diisocyanate.

Examples of the aliphatic polyisocyanate include aliphatic diisocyanates such as trimethylenediisocyanate, tetramethylenediisocyanate (TMDI), pentamethylenediisocyanate (PDI), hexamethylene diisocyanate (HDI), 1,2-, 2,3- or 1,3-butylenediisocyanate, and 2,4,4- or 2,2,4-trimethylhexamethylene diisocyanate.

Examples of the aralkyl polyisocyanate include aralkyl diisocyanates such as 1,3- or 1,4-xylylene diisocyanate or a mixture thereof (XDI), 1,3- or 1,4-tetramethylxylylene diisocyanate or a mixture thereof (TMXDI), and ω,ω'-diisocyanato-1,4-diethylbenzene.

Examples of the aromatic polyisocyanate include aromatic diisocyanates such as 4,4'-, 2,4'- or 2,2'-diphenylmethane diisocyanate or a mixture thereof (MDI), 2,4- or 2,6-tolylene diisocyanate or a mixture thereof (TDI), 3,3'-dimethoxybiphenyl-4,4'-diisocyanate, 1,5-naphthalene diisocyanate (NDI), m- or p-phenylene diisocyanate or a mixture thereof, 4,4'-diphenyl diisocyanate, and 4,4'-diphenylether diisocyanate.

Examples of the additional polyisocyanate include multimers (e.g., dimer, trimer (to be specific, isocyanurate-modified substance, etc.), etc.) of polyisocyanates (including BIC and additional polyisocyanate, the same applies in the following as well), and polyisocyanate derivatives including, for example, biuret-modified polyisocyanates produced by reaction between polyisocyanate or a multimer and water, allophanate-modified polyisocyanates produced by reaction between polyisocyanate or a multimer and alcohol or low molecular-weight polyol (described later), and oxadiazinetrione-modified polyisocyanates produced by reaction between polyisocyanate or a multimer and carbon dioxide.

The additional polyisocyanate may be used singly or in a combination of two or more.

For the additional polyisocyanate, preferably, alicyclic polyisocyanate, and aralkyl polyisocyanate are used, and even more preferably, IPDI and XDI are used.

Use of the above-described alicyclic polyisocyanate and/or aralkyl polyisocyanate along with BIC improves air permeability and resistant to discoloration compared with the case where an aromatic polyisocyanate is used in combination with BIC, and improves air permeability compared with the case where a polyisocyanate derivative is used in combination with BIC.

The mixing ratio of the additional polyisocyanate relative to 100 parts by mass of the polyisocyanate (a) is, for example, 50 parts by mass or less, preferably 45 parts by mass or less, even more preferably 40 parts by mass or less, and for example, 10 parts by mass or more.

The polyol (b) contains polyol (b-1) having an average functionality of 1.5 to 4.5 and a hydroxyl number of 20 to 70 mgKOH/g, and polyol (b-2) having an average functionality of 1.5 to 4.5 and a hydroxyl number of 140 to 300 mgKOH/g.

Examples of the polyol (b-1) and the polyol (b-2) include polyoxyalkylene polyol.

Examples of the polyoxyalkylene polyol include those produced by adding (polymerizing) alkylene oxide to initiators such as water, low molecular-weight alcohol, low molecular-weight amine, and ammonia in the presence of a polymerization catalyst.

Examples of the low molecular-weight alcohol include those having a molecular weight of 400 or less, to be specific, monohydric or polyhydric aliphatic alcohols including monohydric aliphatic alcohols such as methanol and ethanol; dihydric aliphatic alcohols such as ethylene glycol, propylene glycol, and dipropylene glycol; trihydric aliphatic alcohols such as glycerine and trimethylolpropane; tetrahydric aliphatic alcohols such as pentacrythritol and diglycerol; hexahydric aliphatic alcohols such as sorbitol; and octahydric aliphatic alcohols such as sucrose.

Examples of the low molecular-weight amine include those having a molecular weight of 400 or less, to be specific, monofunctional or polyfunctional aliphatic amines (aliphatic amine having one or a plurality of active hydrogens) including monofunctional aliphatic amines (aliphatic amine having one active hydrogen) such as dimethylamine and diethylamine; difunctional aliphatic amines (aliphatic amine having two active hydrogens) such as methylamine and ethylamine; trifunctional aliphatic amines (aliphatic amine having three active hydrogens)(to be specific, alkanol amine) such as monoethanolamine, diethanolamine, and triethanol amine; tetrafunctional aliphatic amines (aliphatic amine having four active hydrogens) such as ethylene diamine, 1,3- and/or 1,4-bis(aminomethyl)cyclohexane, and isophoron diamine; pentafunctional aliphatic amine (aliphatic amine having five active hydrogens) such as diethylene triamine. Examples of the low molecular-weight amine also include polyfunctional aromatic amines (aromatic amine having a plurality of active hydrogens) including aromatic diamines such as 2,4- or 2,6-tolylenediamine (TDA).

For those examples of the initiator, preferably, monohydric or polyhydric aliphatic alcohols are used, even more preferably, dihydric or hexahydric aliphatic alcohols are used.

For the polyol (b-1) and the polyol (b-2), the initiator can be used singly or used in combination, but the formulation is made so as to achieve the average functionality of 1.5 to 4.5.

Examples of the polymerization catalyst include alkali metal catalysts such as potassium hydroxide, sodium hydroxide, and cesium hydroxide; and composite metal catalysts such as cyano complex of zinc and cobalt (e.g., composite metal cyanide complex described in U.S. Pat. No. 4,477,589).

When using the composite metal catalyst as the polymerization catalyst, for example, first, a portion of alkylene oxide is subjected to addition polymerization with an initiator, and then the composite metal catalyst is added, and thereafter, the remaining portion of alkylene oxide is subjected to addition polymerization in conformity with, for example, the method described in U.S. Pat. No. 3,905,638.

For the polymerization catalyst, preferably an alkali metal catalyst is used.

An alkali metal catalyst can suppress increase in apparent core density of the low-resilience polyurethane foam compared with a composite metal catalyst.

Examples of alkylene oxide include ethylene oxide, propylene oxide, 1,2-, 1,3-, 1,4- and 2,3-butylene oxide, and use of these in combination of two or more. Of these examples of alkylene oxide, preferably, propylene oxide is used singly, and/or propylene oxide and ethylene oxide are used in combination. When propylene oxide and ethylene oxide are used in combination, the addition can be performed by way of block or random, and preferably, the addition can be performed by way of block.

To be specific, for alkylene oxide that forms the polyol (b-1), preferably, propylene oxide is used singly.

Meanwhile, for the alkylene oxide that forms the polyol (b-2), to be specific, propylene oxide and ethylene oxide are used in combination. When these are used in combination, the oxyethylene unit in the oxyalkylene unit is, for example, 10 mass % or more, preferably 15 mass % or more, and for example, 40 mass % or less, preferably 25 mass % or less. Meanwhile, the oxypropylene unit in the oxyalkylene unit is, for example, 90 mass % or less, preferably 85 mass % or less, and for example, 60 mass % or more, preferably 75 mass % or more.

Furthermore, for the polyol (b-1) and/or the polyol (b-2), the above-described polyoxyalkylene polyol can be used in combination with vinyl polymer-containing polyoxyalkylene polyol, polyester polyol, or a polyoxyalkylene polyester block copolymer.

Examples of the vinyl polymer-containing polyoxyalkylene polyol include those produced by polymerizing vinyl monomers such as acrylonitrile and styrene in the presence of radicals in the polyoxyalkylene polyol given as examples above, and stably dispersing the polymerized product. The polyoxyalkylene polyol has a vinyl polymer content of generally 15 to 45 mass/%.

Examples of the polyester polyol include those produced by condensation polymerization of one, or two or more types of compounds having two or more hydroxyl groups such as ethylene glycol, diethylene glycol, triethylene glycol, 1,2-propylene glycol, trimethylene glycol, 1,3 or 1,4-butylene glycol, hexamethylene glycol, decamethylene glycol, glycerine, trimethylolpropane, pentaerythritol, and sorbitol with one, or two or more types of compounds having two or more carboxyl groups such as adipic acid, succinic acid, malonic acid, maleic acid, tartaric acid, pimelic acid, sebacic acid, phthalic acid, terephthalic acid, isophthalic acid, and trimellitic acid; or those produced by ring-opening polymerization of, for example, ε-polycaprolactone.

Examples of the polyoxyalkylene polyester block copolymer polyol include, as described in Japanese Examined Patent Publication Sho 48-10078, those having a structure of polyoxyalkylene polyol having blocked polyester chains. That is, examples of the polyoxyalkylene polyester block copolymer polyol include those having a portion represented by general formula (1), the portion replacing hydrogen atoms of hydroxyl groups of polyoxyalkylene polyol or a derivative having hydroxy groups,

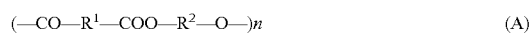

(where $R^1$ and $R^2$ each represents a divalent hydrocarbon group and n represents a number larger than 1 in average).

In general formula (1), the divalent hydrocarbon residue represented by $R^1$ include saturated aliphatic or aromatic polycarboxylic acid residue; and the divalent hydrocarbon residue represented by $R^2$ include a residue of a compound having a cyclic ether group that underwent cleavage; and n is preferably a number of 1 to 20.

The polyoxyalkylene polyester block copolymer polyol is produced by allowing polyoxyalkylene polyol to react with polycarboxylic acid anhydride and alkylene oxide.

The mixing ratio of the vinyl polymer-containing polyoxyalkylene polyol, polyester polyol, or polyoxyalkylene polyester block copolymer relative to 100 parts by mass of the polyoxyalkylene polyol is, for example, 50 parts by mass or less, preferably 30 parts by mass or less.

The polyol (b-1) has an average functionality of 1.5 to 4.5, preferably 2.5 to 3.5, and a hydroxyl number of 20 to 70 mgKOH/g, preferably 30 to 60 mgKOH/g. The polyol (b-2) has an average functionality of 1.5 to 4.5, preferably 2.5 to 3.5, and a hydroxyl number of 140 to 300 mgKOH/g, preferably 125 to 250 mgKOH/g.

The average functionality of the polyol (b-1) and/or the polyol (b-2) smaller than 1.5 significantly reduces physical properties such as dry heat permanent set of the low-resilience polyurethane foam.

Meanwhile, the average functionality of the polyol (b-1) and/or the polyol (b-2) larger than 4.5 decreases elongation of the low-resilience polyurethane foam while its hardness is increased, and therefore physical properties such as tensile strength is decreased.

Furthermore, the hydroxyl number of the polyol (b-1) smaller than 20 mgKOH/g coarses cells of the low-resilience polyurethane foam, and damages moist touch of the low-resilience polyurethane foam. Meanwhile, the hydroxyl number of the polyol (b-1) larger than 70 mgKOH/g causes shrinkage after foaming of the low-resilience polyurethane foam.

The hydroxyl number of the polyol (b-2) smaller than 140 mgKOH/g causes shrinkage and then foaming during foaming of the low-resilience polyurethane foam. Meanwhile, the hydroxyl number of the polyol (b-2) larger than 300 mgKOH/g increases hardness of the low-resilience polyurethane foam, and damages soft touch of the low-resilience polyurethane foam.

The hydroxyl number of the polyol (b) can be determined in conformity with acetylation method or phthalic anhydride method of method A or B of JIS K 1557-1.

The polyol (b) has a polyol (b-1) content of 5 to 30 mass % and a polyol (b-2) content of 70 to 95 mass %.

The polyol (b-1) content less than the above-described lower limit, that is, the polyol (b-2) content of more than the above-described upper limit decreases air permeability of the low-resilience polyurethane foam, and causes an excessively small number of the cells per unit area, and therefore the cells are excessively coarsened, and thus touch of the low-resilience polyurethane foam significantly degraded.

Meanwhile, the polyol (b-1) content of more than the above-described upper limit, that is, the polyol (b-2) content of less than the above-described lower limit decreases air permeability of the low-resilience polyurethane foam, and shrinks the foamed low-resilience polyurethane foam.

Furthermore, the polyol (b) has a polyol (b-1) content of preferably 8 to 25 mass %, even more preferably 15 to 23 mass %, and a polyol (b-2) content of preferably 75 to 92 mass %, even more preferably 77 to 85 mass %.

For the catalyst (c), a known catalyst generally used for polyurethane foam production may be used. Examples of such a catalyst include amine catalysts such as tertiary amine compounds including triethylamine, triethylene diamine, and N-methylmorphiline; quaternary ammonium salt compounds including tetraethylhydroxyl ammonium; and imidazole compounds including imidazole and 2-ethyl-4-methyl imidazole; inorganic tin compounds (tin salt of organic acid) such as tin acetate and tin octylate; organic metal catalysts such as organic tin compounds such as dibutyltin dilaurate, dibutyltin chloride, dimethyltin dineodecanoate, and dimethyltin dithioglycolate; and bismuth compounds including bismuth octylate and bismuth neodecanoate; organic lead compounds including lead octylate and lead naphthenate; organic nickel compounds including nickel naphthenate and nickel acetylacetonate; and organic zirconium compounds such as zirconium tetraacetyl acetonate.

The catalyst (c) can be used singly, or can be used in combination in a plural number.

When a plural types of the catalysts are used in combination, preferably, an amine catalyst and an organic metal catalyst are used in combination.

For the blowing agent (d), a known blowing agent generally used for polyurethane foam production may be used. Examples of such a blowing agent include water, and halogen-substituted aliphatic hydrocarbons such as trichlorofluoromethane, dichlorodifluoromethane, trichloroethane, trichloroethylene, tetrachloroethylene, methylene chloride, trichlorotrifluoroethane, dibromotetrafluoroethane, and carbon tetrachloride.

These examples of the blowing agent can be used singly or can be used in combination of two or more.

For the blowing agent, preferably, water can be used singly.

The low-resilience polyurethane foam composition can contain cross-linking agent (e).

The cross-linking agent (e) is blended to improve impact resilience of the low-resilience polyurethane foam, and furthermore for a low density low-resilience polyurethane foam, increase in air flow value, and finer cells, and for example, alkanolamine is used.

Examples of alkanolamine include polyalkanolamines such as trialkanolamine (tri C2 to 4 alkanolamine) including trimethanolamine, triethanol amine, tripropanolamine, triisopropanolamine, and tributanolamine, and dialkanolamine (di C2 to 4 alkanolamine) including diethanolamine.

Examples of the cross-linking agent (e) also include, in addition to the above-described alkanolamine, low molecular-weight alcohol and/or alkylene oxide-added polyol of these, tetrafunctional aliphatic amine, aliphatic and alicyclic secondary diamine (to be specific, JEFFLINK 754 (manufactured by Huntsman), CLEARLINK1000 (manufactured by Dorf Ketal Chemicals), CLEARLINK3000 (manufactured by Dorf Ketal Chemicals), and ETHACURE90 (manufactured by ALBEMARLE)). Examples of the low molecular-weight alcohol include those low molecular-weight alcohols given as examples described above.

These examples of the cross-linking agent (e) can be used singly, or can be used in combination of two or more.

Preferably, alkanol amine (more preferably, trialkanol amine, even more preferably, triethanol amine or triisopropanol amine) can be used singly, or alkanol amine and a low molecular-weight alcohol (more preferably, trialkanol amine and trihydric aliphatic alcohol, even more preferably, triethanol amine and glycerine, or triethanol amine, triisopropanol amine, and glycerine) are used in combination.

Use of alkanol amine singly for the cross-linking agent (e) allows for a low density low-resilience polyurethane foam, improvement in low-resilience (that is, decrease in impact resilience), increase in air flow value, and finer cells.

Use of alkanolamine and a low molecular-weight alcohol in combination for the cross-linking agent (e) allows for a low-density low-resilience polyurethane foam, increase in air flow value, and improvement in resistant to discoloration.

Meanwhile, use of a low molecular-weight alcohol singly as the cross-linking agent (e) may cause increase in the core density of the low-resilience polyurethane foam, increase in impact resilience, decrease in air flow value, and coarsening of the cells.

Furthermore, the low-resilience polyurethane foam composition can contain open-cell blowing agent (f).

Examples of the open-cell blowing agent (f) include polyols synthesized in the same manner as the method for the above-described polyol (b), to be specific, a polyol (to be specific, polyoxyalkylene polyol) having an average functionality of 1.5 or more, preferably 2 or more, and for example, 8 or less, preferably 6 or less, an oxyethylene unit content of, for example, more than 50 mass %, preferably 60 mass % or more, more preferably 70 mass % or more, and a hydroxyl number of 20 mgKOH/g or more, preferably 35 mgKOH/g or more, and for example, 200 mgKOH/g or less, preferably 150 mgKOH/g or less.

The low-resilience polyurethane foam composition containing the open-cell blowing agent (f) can improve open-cell ratio of the low-resilience polyurethane foam and increase air flow value.

Meanwhile, the low-resilience polyurethane foam composition that does not contain the open-cell blowing agent (f) allows for a low density low-resilience polyurethane foam.

The low-resilience polyurethane foam composition can contain a foam stabilizer and other auxiliary agents in addition to the above-described components as necessary.

For the foam stabilizer, for example, a known foam stabilizer generally used for polyurethane foam production may be used. Examples thereof include silicone-based foam stabilizers such as L-568, L-580, TL-590, L-598, L-600, L-620, L-635, L-638, L-650, L-680, L-682, SC-155, Y-10366, L-5309, L-5614, L-5617, L-5627, L-5639, L-5624, L-5690, L-5693, and L-5698 of Momentive Performance Materials Inc.; F-607, F-606, F-242T, F-114, and F-348 of Shin-Etsu Chemical Co., Ltd.; DC5598, DC5933, DC5609, DC5986, DC5950, DC2525, DC2585, DC6070, and DC3043 of Air Products and Chemicals, Inc.; SZ-1919, SH-192, SH190, SZ-580, SRX280A, SZ-584, SF2904, SZ-5740M, SZ-1142, and SZ-1959 of Dow Corning Toray Co., Ltd.; and B-8002 and B-8545 of Evonik Degussa Japan Co., Ltd. These foam stabilizers can be used singly, or can be used in combination with a plurality of foam stabilizers.

Other examples of the auxiliary agent include known antioxidants, ultraviolet absorbers, light stabilizers, and anti-yellowing agents generally used for polyurethane foam production.

Examples of the antioxidant include hindered phenolic compounds (to be specific, IRGANOX 1135, IRGANOX 245, IRGANOX 1076, IRGANOX 1726, and IRGANOX 1520L, all manufactured by BASF, to be specific, ADK STAB AO-80 manufactured by ADEKA CORPORATION, to be specific, SUMILIZER GA-80 manufactured by Sumitomo Chemical Co., Ltd.), organic phosphorus compounds (to be specific, JP-302, JP-308, JP-308E, JP-310, JP-312L, JP-333E, JP-318O, JPS-312, JPP-13R, JP-318E, all manufactured by Johoku Chemical Co. Ltd., to be specific, IRGAFOS 38, and IRGAFOS P-EPQ, all manufactured by BASF, to be specific, ADK STAB PEP-4C, ADK STAB PEP-8, ADK STAB 1500, and ADK STAB 3010, all manufactured by ADEKA CORPORATION, to be specific, SUMILIZER GP manufactured by Sumitomo Chemical Co., Ltd.), thioether compounds (to be specific, IRGANOX PS800FL and IRGANOX PS802FL, all manufactured by BASF, to be specific, ADK STAB AO-412S and ADK STAB AO-503, all manufactured by ADEKA CORPORATION, to be specific, Yoshitomi DLTP, Yoshitomi DSTP, and Yoshitomi DMTP, all manufactured by API CORPORATION), and hydroxyl amine compounds (to be specific, IRGASTAB FS 042 manufactured by BASF).

Examples of the ultraviolet absorber include benzotriazole compounds (to be specific, TINUVIN 571, TINUVIN 213, TINUVIN 234, and TINUVIN P, all manufactured by BASF), and formamidine compounds (to be specific, Zikasorb R, Zikasorb BS, ZIKA-FA02, ZIKA-FUA, ZIKA-FUV, ZIKA-UVS3, and ZIKA-UVS4, all manufactured by ZIKO).

Examples of the light stabilizer include hindered amine compounds (to be specific, TINUVIN 765, TINUVIN 770, and TINUVIN 622LD, all manufactured by BASF, to be specific, ADK STAB LA-52, ADK STAB LA-57, ADK STAB LA-63P, ADK STAB LA-68, ADK STAB LA-72, ADK STAB LA-82, and ADK STAB LA-87, all manufactured by ADEKA CORPORATION).

Anti-yellowing agents are a stabilizer for suppressing discoloration by NOx gas, and examples thereof include semicarbazide (to be specific, HN-130, HN-150, and HN-300P, all manufactured by Japan Finechem Inc.).

The polyisocyanate (a) is blended in the low-resilience polyurethane foam composition in an amount so that the isocyanate index (a value obtained by multiplying the ratio of isocyanate group concentration to active hydrogen group concentration by 100, NCO concentration/active hydrogen group concentration×100) is, for example, 50 to 125, preferably 60 to 110, even more preferably 70 to 105.

The mixing ratio of each of the components excluding the polyisocyanate (a) and the polyol (b) relative to 100 parts by mass of the polyol (b) is, in the case of catalyst (c), for example, 0.01 to 5 parts by mass, preferably 0.05 to 2 parts by mass, and in the case of blowing agent (d), for example, 0.5 to 4.5 parts by mass, preferably 0.8 to 3.5 parts by mass. When the cross-linking agent (e) is blended, for example, 0.1 to 20 parts by mass, preferably 0.4 to 10 parts by mass, more preferably 3 to 8 parts by mass of the cross-linking agent (e) is blended relative to 100 parts by mass of the polyol (b), and when the open-cell blowing agent (f) is blended, for example, 1 to 10 parts by mass, preferably 2 to 5 parts by mass of the open-cell blowing agent (f) is blended relative to 100 parts by mass of the polyol (b).

The mixing ratio of the cross-linking agent (e) of the above-described upper limit or less ensures excellent resistance to discoloration of the low-resilience polyurethane foam, and the mixing ratio of the cross-linking agent (e) of the above-described lower limit or more sufficiently improves impact resilience of the low-resilience polyurethane foam.

When the foam stabilizer, the antioxidant, the ultraviolet absorber, and the light stabilizer are each blended, for example, 0.1 to 5 parts by mass, preferably 0.2 to 2.0 parts by mass of each is blended relative to 100 parts by mass of the polyol (b).

The low-resilience polyurethane foam composition is prepared by a known method such as a one-shot process and a prepolymer process.

In the one-shot process, for example, the above-described components are blended at once and stirred and mixed.

The preparation can be done, for example, as follows: in the one-shot process, first, the components other than the polyisocyanate (a) are blended, stirred and mixed to prepare a premix, and thereafter, the polyisocyanate (a) is blended to the prepared premix so as to achieve the above-described isocyanate index, and the mixture is stirred.

Meanwhile, in the prepolymer process, for example, the polyisocyanate (a), and a portion of the polyol (b), and as necessary the cross-linking agent (e) are blended (charged), and they are allowed to react to prepare an isocyanate group-terminated prepolymer. To be specific, the polyisocyanate (a) and the polyol (b) are blended so that its isocyanate group content (isocyanate group amount present in the prepolymer shown in mass fraction, can be determined by method A of JIS K 1603-1 (2007)) is, for example, 5 to 43 mass %, preferably 10 to 38 mass %.

Thereafter, a remaining portion of the polyol (b) and as necessary the cross-linking agent (e), components other than the above-described components (to be specific, catalyst (c), blowing agent (d), and as necessary foam stabilizer, and other auxiliary agent) are blended with the isocyanate group-terminated prepolymer, and they are allowed to react to prepare the low-resilience polyurethane foam composition.

Then, by allowing the polyurethane foam composition to foam at the above-described ratio by, for example, a known foaming method such as a slab foaming process, mold foaming process, spray foaming process, and mechanical frothing foaming process, a low-resilience polyurethane foam can be produced.

The low-resilience polyurethane foam can be subjected to post treatments such as crushing and explosion to improve air permeability. The crushing can be performed, for example, by allowing the low-resilience polyurethane foam to pass through crushing rollers. In the explosion, gas such as hydrogen and oxygen is introduced into the low-resilience polyurethane foam in a chamber to ignite and explode, thereby removing cell films of the low-resilience polyurethane foam.

The thus produced low-resilience polyurethane foam has an apparent core density determined in conformity with JIS K7222 (2005) of, for example, 10 kg/m$^3$ or more, preferably 30 kg/m$^3$ or more, and for example, 100 kg/m$^3$ or less, preferably 70 kg/m$^3$ or less.

The low-resilience polyurethane foam has a resilience by ball rebound (impact resilience) determined in conformity with JIS K 6400 (2004) of, for example, 14% or less, preferably 12% or less, more preferably 10% or less, even more preferably 7% or less, and for example, 2% or more.

A low-resilience polyurethane foam sample (air flow value measurement sample) cut into a thickness of 10 mm and then subjected to crushing or explosion has an air flow value of, for example, 45 ml/cm²/seconds or more, preferably 55 ml/cm²/seconds or more, more preferably 65 ml/cm²/seconds or more, even more preferably 70 ml/cm²/seconds or more, and furthermore preferably 75 ml/cm²/seconds or more, 80 ml/cm²/seconds or more, 85 ml/cm²/seconds or more, 90 ml/cm²/seconds or more, 95 ml/cm²/seconds or more, 100 ml/cm²/seconds or more, and for example, 300 ml/cm²/seconds or less, preferably 200 ml/cm²/seconds or less.

The low-resilience polyurethane foam has Δb of before and after ultraviolet ray irradiation of, for example, 18 or less, preferably 15 or less, even more preferably 13 or less, and for example, 1 or more.

The Δb is an index for resistance to UV discoloration of low-resilience polyurethane foam, and the Δb of more than the above-described upper limit shows that resistance to UV discoloration of the low-resilience polyurethane foam is low.

The measurement method of the Δb is described in detail in Examples later on.

The number of the cells in the low-resilience polyurethane foam is, for example, 150 or more, preferably 190 or more, even more preferably 220 or more, and for example, 400 or less, preferably 350 or less, even more preferably 300 or less.

The number of the cells per unit area (1 cm²) is an index of the cell size in the low-resilience polyurethane foam.

The number of the cells of the above-described lower limit or more can prevent coarsening of the cells, and the above-described upper limit or less can prevent excessively superfine low-resilience polyurethane foam.

The measurement method for the cell number is described in detail later on in Examples.

As described above, the low-resilience polyurethane foam of the present invention produced by the method for producing a low-resilience polyurethane foam of the present invention has excellent low-resilience, and furthermore excellent resistant to discoloration, and excellent air permeability.

Therefore, the low-resilience polyurethane foam can be effectively used, for example, as a low-resilience elastomer including a shock absorbing material, a sound absorbing material, a vibration absorbing material, and a body pressure relieving material.

To be more specific, the low-resilience polyurethane foam can be used as a low-resilience elastomer for, for example, an automobile passenger sheet, a cushion, a pillow, mattress, an insole, a sealing material, a soundproof flooring material, a door trim, a packing material, an earplug, a cosmetic puff, wallpaper, a bedsore protection pad, a surface protection material for robots, and a nose pad for masks.

The low-resilience polyurethane foam of the present invention particularly has excellent low-resilience, excellent resistant to discoloration, and excellent air permeability, and therefore can be used suitably for, for example, a body-pressure relieving material for apparel or shoes, to be specific, a pad for brassieres, a cup for brassieres, a shoulder pad, and a tongue portion for shoes.

EXAMPLES

In the following, the present invention is described in detail based on Synthesis Examples, Examples, and Comparative Examples. However, the present invention is not limited to these.

1) Materials

Materials are prepared in accordance with Synthesis Examples below and as shown in Table 1 to Table 4.

Synthesis Example 1-1

Synthesis of Polyisocyanate (a)(1-1)

1,4-BIC was synthesized as polyisocyanate (a)(1-1) in accordance with Production Example 3 of WO2009-51114.

The produced 1,4-BIC bad a purity measured by gas chromatography of 99.9%, and a trans/cis ratio measured by $^{13}$C-NMR based on mol of 86/14.

Synthesis Example 1-2

Synthesis of Polyisocyanate (a)(1-2)

1,4-BIC was synthesized as polyisocyanate (a)(1-2) in accordance with Production Example 4 of Japanese Unexamined Patent Publication No. 2011-140618.

The produced 1,4-BIC had a purity measured by gas chromatography of 99.9%, and a trans/cis ratio measured by $^{13}$C-NMR based on mol of 70/30.

Synthesis Example 1-3

Synthesis of Polyisocyanate (a)(1-3)

1,4-BIC was synthesized as polyisocyanate (a)(1-4) in accordance with Production Example 1 of Japanese Unexamined Patent Publication No. 2011-140618.

The produced 1,4-BIC had a purity measured by gas chromatography of 99.9%, and a trans/cis ratio measured by $^{13}$C-NMR based on mol of 93/7.

Synthesis Example 1-4

Synthesis of polyisocyanate (a)(1-4)

A reactor equipped with a stirrer, a gas inlet tube, a thermometer, a gas purge line, and a condenser was charged with 286.6 parts by mass of 1,4-cyclohexanedicarboxylic acid, 55.7 parts by mass of N,N'-dimethylimidazolidinone, and 3.6 parts by mass of tin (II) oxide. Ammonia gas and nitrogen were allowed to pass through in mixture at 90 mL/min (0.14 mol equivalent/1,4-cyclohexanedicarboxylic acid/hr) and at 10 mL/min, respectively while stirring, and the temperature was increased to 280° C. Thereafter, the temperature was kept constant, thereby allowing the mixture to react. The reaction was terminated at that temperature after 48 hours, and the mixture was cooled to 90° C.

520 parts by mass of 1-butanol was added to the product, and the mixture was stirred. The liquid was subjected to hot filtration, thereby removing the catalyst. The filtrate was analyzed by gas chromatography, and it was found that the yield of 1,4-dicyanocyclohexane was 86%.

Next, the filtrate produced as described above was cooled to room temperature while stirring, and precipitation occurred. The suspension was filtered, and 230 parts by mass of 1-butanol was added to the residue. The mixture was stirred at 90° C. for 1 hour, and thereafter, cooled to room temperature while stirring, and again, precipitation occurred. The suspension was filtered, and washed with 1-butanol twice, and thereafter, the filtrate was dried, thereby producing 100 parts by mass of white solid (yield 45%).

Analysis by gas chromatography revealed that the solid was 1,4-dicyanocyclohexane with a purity of 99.5% or more, and the result of $^{13}$C-NMR analysis showed that its trans isomer/cis isomer ratio was 99/1.

Next, a pressure-resistant reactor equipped with a stirrer was charged with 550 parts by mass of the above-described 1,4-dicyanocyclohexane having a trans isomer/cis isomer ratio of 99/1, 30 parts by mass of a catalyst (Raney nickel manufactured by Kawaken Fine Chemicals Co., Ltd.), 560 parts by mass of 28 wt % ammonia water, and 1050 parts by mass of 1-butanol. Replacement was conducted three times by introducing nitrogen from the nozzle of the reactor at 5 MPa, and the mixture was heated under normal pressure while stirring at 400 rpm to 80° C.

When the temperature reached 80° C., hydrogen feeding was started so that the pressure was 4.5 MPa, and reaction was conducted until there is no hydrogen absorption. The reaction time was 3 hours.

After the completion of reaction, the reaction product liquid was cooled to room temperature. The reaction product liquid was taken out, and then filtered to remove the catalyst.

The filtrate was analyzed by gas chromatography, and it was found that 1,4-dicyanocyclohexane conversion rate was 100%, the 1,4-bis(aminomethyl)cyclohexane yield was 98%, and the trans/cis ratio analyzed by $^{13}$C-NMR was 98/2 based on mol.

The reaction solution was subjected to reduced-pressure distillation at 10 mmHg, thereby producing 1,4-bis(aminomethyl)cyclohexane (1,4-BAC) having a purity of 99.5% or more and a trans isomer/cis isomer ratio of 98/2 with a yield of 93%.

Using this 1,4-BAC, 1,4-BIC was synthesized by hot/cold two-stage phosgene method. The produced 1,4-BIC had a purity measured by gas chromatography of 99.9%, an APHA color of 5, and a trans isomer/cis isomer ratio measured by $^{13}$C-NMR of 98/2.

Synthesis Example 2

Synthesis of Polyol (b-1)(1)

Glycerine was subjected to addition polymerization of propyleneoxide in the presence of potassium hydroxide (polymerization catalyst), thereby synthesizing polyoxypropylenetriol having an average functionality of 3 and a hydroxyl number of 34.0 mgKOH/g as polyol (b-1)(1).

Synthesis Example 3

Synthesis of Polyol (b-1)(2)

Glycerine was subjected to addition polymerization of propylene oxide. The produced polyoxypropylenetriol (manufactured by Mitsui Chemicals, trade name: T1000) in which glycerine was subjected to polymerization catalyst of propylene oxide was subjected to further addition polymerization of propylene oxide in accordance with the method described in Comparative Example 6 of U.S. Pat. No. 3,905,638 using the composite metal cyanide complex ($Zn_3$[Co(CN)$_6$]$_2$.2.48DME.4.65H$_2$O.0.94ZnCl$_2$. DME is an abbrebiation of 1,2-dimethoxyethane.) prepared in accordance with U.S. Pat. No. 4,477,589 as a polymerization catalyst, thereby synthesizing polyoxypropylenetriol having an average functionality of 3 and a hydroxyl number of 33.8 mgKOH/g as polyol (b-1)(2).

Synthesis Example 4

Synthesis of Polyol (b-2)

Glycerine was subjected to addition polymerization of propyleneoxide and ethyleneoxide in the presence of potassium hydroxide (polymerization catalyst), thereby synthesizing polyoxyalkylenetriol having an average functionality of 3, a hydroxyl number of 180.2 mgKOH/g, and an oxyethylene unit content of 18 mass % as polyol (b-2).

Synthesis Example 5

Synthesis of Open-Cell Blowing Agent (f)(1)

Glycerine was subjected to addition polymerization of ethylene oxide in the presence of potassium hydroxide (polymerization catalyst), and thereafter, subjected to addition polymerization of propylene oxide and ethylene oxide randomly, thereby synthesizing polyoxyalkylenetriol having an average functionality of 3, a hydroxyl number of 49.9 mgKOH/g, and an oxyethylene unit content of 75 mass % as polyol (f)(1).

Synthesis Example 6

Synthesis of Open-Cell Blowing Agent (f)(2)

Dipropylene glycol was subjected to addition polymerization of ethylene oxide in the presence of potassium hydroxide (polymerization catalyst), thereby synthesizing polyoxyethylenediol having an average functionality of 2, a hydroxyl number of 125.0 mgKOH/g, and an oxyethylene unit content of 85 mass % as polyol (f)(2).

Synthesis Example 7

Synthesis of Open-Cell Blowing Agent (f)(3)

Diglycerol was subjected to addition polymerization of ethyleneoxide in the presence of potassium hydroxide (polymerization catalyst), thereby producing polyoxyethylenepolyol having an average functionality of 4, an oxyethylene unit content of 91 mass %, and a hydroxyl number of 125.1 mgKOH/g as polyol (f)(3).

The materials shown in Table 1 to Table 4 are listed below.
<Polyisocyanate (a)>
Polyisocyanate (a)(1-1): 1,4-BIC, synthesized in Synthesis Example 1-1, trans/cis ratio=86/14
Polyisocyanate (a)(1-2): 1,4-BIC, synthesized in Synthesis Example 1-2, trans/cis ratio=70/30
Polyisocyanate (a)(1-3): 1,4-BIC, synthesized in Synthesis Example 1-3, trans/cis ratio=93/7
Polyisocyanate (a)(1-4): 1,4-BIC, synthesized in Synthesis Example 1-4, synthesized in Synthesis Example 1-3, trans/cis ratio=98/2
Polyisocyanate (a)(2): 1,3-BIC, manufactured by Mitsui Chemicals, trade name: TAKENATE 600
Polyisocyanate (a)(3): 60/40 (mass ratio) mixture of 1,4-BIC and XDI (manufactured by Mitsui Chemicals, trade name: TAKENATE 500). 1,4-BIC was the one synthesized in Synthesis Example 1-1, trans/cis ratio=86/14.
Polyisocyanate (a)(4): 60/40 (mass ratio) mixture of 1,4-BIC and 1,3-BIC. 1,4-BIC was the one synthesized in Synthesis Example 1-1, trans/cis ratio=86/14.
Polyisocyanate (a)(5): 60/40 (mass ratio) mixture of 1,4-BIC and IPDI (manufactured by Evonik Degussa Japan Co., Ltd., trade name: VESTANAT IPDI). 1,4-BIC was the one synthesized in Synthesis Example 1-1, trans/cis ratio=86/14.

Polyisocyanate (a)(6): TDI (isomer mixture of 2,4- and 2,6-toluenediisocyanate: 2,4/2,6 isomer mixing ratio 80:20, manufactured by Mitsui Chemicals, trade name: Cosmonate T-80)

Polyisocyanate (a)(7): 85/15 (mass ratio) mixture of HDI-1 (allophanate-modified HDI, manufactured by Mitsui Chemicals, trade name: TAKENATE D-178N, NCO %=19.3%) and HDI-2 (nurete-modified HDI, manufactured by Mitsui Chemicals, trade name: TAKENATE D-170N, NCO %=20.7%).

<Polyol (b)>

Polyol (b-1)(1): polyoxypropylenetriol, hydroxyl number 34.0 mgKOH/g, synthesized in Synthesis Example 2

Polyol (b-1)(2): polyoxypropylenetriol, hydroxyl number 33.8 mgKOH/g, synthesized in Synthesis Example 3 (composite metal cyanide complex used as polymerization catalyst)

Polyol (b-2): polyoxyalkylenetriol, hydroxyl number 180.2 mgKOH/g, oxyethylene unit content 18 mass %, synthesized in Synthesis Example 4

<Catalyst c>

Amine catalyst 1: manufactured by Air Products and Chemicals, Inc., trade name: DABCO 33LV, 33% solution of triethylenediamine in dipropylene glycol Amine catalyst 2: manufactured by Tosoh Corporation, trade name: TOYOCAT ET, 70 mass % solution of bis(dimethylaminoethyl) ether in dipropylene glycol Organic metal catalyst 1: manufactured by Momentive Performance Materials Inc., organic lead compound, trade name: FOMREZ UL-28

Organic metal catalyst 2 (manufactured by Air Products and Chemicals, Inc., organic lead compound, trade name: Dabco T-9

<Open-Cell Blowing Agent (f)>

Open-cell blowing agent (f)(1): polyoxyalkylenetriol, hydroxyl number of 49.9 mgKOH/g, oxyethylene unit content 75 mass %, synthesized in Synthesis Example 5

Open-cell blowing agent (f)(2): polyoxyethylenediol, hydroxyl number of 125.0 mgKOH/g, oxyethylene unit content 85 mass %, synthesized in Synthesis Example 6

Open-cell blowing agent (f)(3): polyoxyethylenepolyol, hydroxyl number of 125.1 mgKOH/g, oxyethylene unit content 91 mass %, synthesized in Synthesis Example 7

<Auxiliary Agent>

Silicone-based foam stabilizer 1: manufactured by Air Products and Chemicals, Inc., trade name: DC5906

Silicone-based foam stabilizer 2: manufactured by Shin-Etsu Chemical Co., Ltd., trade name: F-242T Antioxidant 1: manufactured by BASF, hindered phenol compound, trade name: IRGANOX 1135

Antioxidant 2: manufactured by Johoku Chemical Co. Ltd., organic phosphorus compound, trade name: JP-308E Ultraviolet absorber: manufactured by BASF, benzotriazole compound, trade name: TINUVIN 571

Light stabilizer: manufactured by BASF, hindered amine compound, trade name: TINUVIN 765

2) Production of Low-Resilience Polyurethane Foam

Of the components (material) shown in Table 1 to Table 4 below, the components other than the polyisocyanate (b) were weighed; they were blended in accordance with the mixing formulation of Table 1 to Table 4 in a laboratory having a temperature of 23° C. and a relative humidity of 55%; and they are stirred and mixed so that they are homogeneous, thereby preparing a premix.

Separately prepared polyisocyanate (b) was weighed in accordance with the mixing formulation shown in Table 1 to Table 4, and the temperature was adjusted to 23° C.

Thereafter, the polyisocyanate (b) was added to the premix, and the mixture was stirred with a hand-mixer (number of revolution 5000 rpm) for 15 seconds to prepare a low-resilience polyurethane foam composition, and immediately after the preparation, the low-resilience polyurethane foam composition was introduced quickly into a wooden box to foam. A low-resilience polyurethane foam was produced in this manner.

3) Evaluation on Low-Resilience Polyurethane Foam (i) Shrinkage

The produced low-resilience polyurethane foam was allowed to stand in a laboratory having a temperature of 23° C. and a relative humidity of 55% for 2 days, and presence or absence of shrinkage of the low-resilience polyurethane foam thereafter was visually observed. The results are shown in Tables 1 to 4.

(ii) Apparent Core Density (Unit: $kg/m^3$)

(i) A rectangular solid having a size of 10×10×5 cm was cut out from the central portion (core) of the low-resilience polyurethane foam after the shrinkage evaluation to prepare a measurement sample, and thereafter, apparent density of the measurement sample was measured in accordance with JIS K7222 (2005). Apparent core density of the low-resilience polyurethane foam was evaluated in this manner. The results are shown in Tables 1 to 4.

(iii) Resilience by Ball Rebound (Impact Resilience) (Unit: %)

(i) A rectangular solid having a size of 10×10×5 cm was cut out from the central portion of the low-resilience polyurethane foam after the shrinkage evaluation to prepare a measurement sample, and thereafter, resilience by ball rebound (impact resilience) of the measurement sample was measured in accordance with JIS K6400-3 (2004). The results are shown in Tables 1 to 4.

(iv) Air Flow Value (Unit: $Ml/cm^2/sec$)

(i) The low-resilience polyurethane foam after the shrinkage evaluation was cut into a sheet having a thickness of 10 mm, and thereafter subjected to crushing (crushing conditions: low-resilience polyurethane foam passes between two rollers (interval 0.2 mm)) to prepare an air flow value measurement sample, and thereafter, the air flow value of the air flow value measurement sample was measured in accordance with method B of JIS K6400-7 (2004). The results are shown in Tables 1 to 4.

(v) Resistance to UV Discoloration (i) A rectangular solid having a size of 30×40×10 mm was cut out from the low-resilience polyurethane foam after the shrinkage evaluation to prepare a measurement sample, and thereafter, using a QUV weathering tester equipped with an ultraviolet ray fluorescent lamp, the measurement sample was irradiated with ultraviolet ray of a short wavelength (wavelength 270 to 720 nm) for 24 hours.

The Δb (change amount in value b) of the low-resilience polyurethane foam before and after the irradiation was measured using a color difference meter (manufactured by Tokyo Denshoku CO., LTD., COLOR ACE MODEL TC-1). The results are shown in Tables 1 to 4.

The Δb is an index of resistance to UV discoloration of a low-resilience polyurethane foam.

(vi) The Number of the Cells Per Unit Area (1 cm²) (Unit: Number/cm²)

The number of cells per unit area was measured based on the following method.

That is, first, black ink was applied thinly on a smooth cut surface of the low-resilience polyurethane foam after evaluation of (i). Then, the applied surface was magnified to 20 times using a CCD camera (manufactured by Keyence Corporation, microscope VHX-900) and was shown on a display. A region corresponding to 1 cm² of the low-resilience polyurethane foam is shown on the same display in overlapping manner, and the number of the cells included in the region was counted visually, regarding it as the number of the cells per unit area (1 cm²). The results are shown in Tables 1 to 4.

TABLE 1

| | | | Ex. 1 | Ex. 2 | Ex. 3 | Ex. 4 | Ex. 5 | Ex. 6 |
|---|---|---|---|---|---|---|---|---|
| Polyisocyanate (a) | Polyisocyanate (a)(1-1) | 1,4-BIC, trans/cis ratio = 86/14 | 54.67 | 52.16 | 50.63 | — | — | — |
| | Polyisocyanate (a)(1-2) | 1,4-BIC, trans/cis ratio = 70/30 | — | — | — | — | — | — |
| | Polyisocyanate (a)(1-3) | 1,4-BIC, trans/cis ratio = 93/7 | — | — | — | — | — | — |
| | Polyisocyanate (a)(1-4) | 1,4-BIC, trans/cis ratio = 98/2 | — | — | — | — | — | — |
| | Polyisocyanate (a)(2) | 1,3-BIC | — | — | — | 54.81 | 52.30 | 50.63 |
| | Polyisocyanate (a)(3) | 1,4-BIC*[1]/XDI(60/40) | — | — | — | — | — | — |
| | Polyisocyanate (a)(4) | 1,4-BIC*[1]/1,3-BIC(60/40) | — | — | — | — | — | — |
| | Polyisocyanate (a)(5) | 1,4-BIC*[1]/IPDI(60/40) | — | — | — | — | — | — |
| | Polyisocyanate (a)(6) | TDI | — | — | — | — | — | — |
| | Polyisocyanate (a)(7) | HDI-1/HDI-2(85/15) | — | — | — | — | — | — |
| | Isocyanate index | (NCO concentration/OH concentration) × 100 | 70 | 70 | 70 | 70 | 70 | 70 |
| Polyol (b) | Polyol (b-1)(1) | Hydroxyl number 34.0(mgKOH/g) Oxyethylene unit content 0(%) | 6.01 | 20.01 | 29.03 | 6.03 | 20.07 | 28.97 |
| | Polyol (b-1)(2) | Hydroxyl number 33.8(mgKOH/g) Oxyethylene unit content 0(%) | — | — | — | — | — | — |
| | Polyol (b-2) | Hydroxyl number 180.2(mgKOH/g) oxyethylene unit content 18(%) | 93.99 | 79.99 | 71.07 | 93.97 | 79.97 | 71.03 |
| Catalyst (c) | Amine catalyst 1 | 33LV | 0.52 | 0.50 | 0.50 | 0.49 | 0.50 | 0.50 |
| | Amine catalyst 2 | ET | 0.50 | 0.49 | 0.50 | 0.50 | 0.50 | 0.50 |
| | Organic metal catalyst 1 | UL-28 | 0.15 | 0.15 | 0.15 | 0.15 | 0.15 | 0.15 |
| | Organic metal catalyst 2 | T-9 | — | — | — | — | — | — |
| Blowing agent (d) | | Ion exchange water | 3.00 | 2.99 | 3.00 | 3.02 | 3.00 | 3.00 |
| Cross-linking agent (e) | Alkanolamine | Triethanol amine | 7.99 | 8.01 | 8.00 | 8.00 | 8.03 | 8.00 |
| | | Triisopropanolamine | — | — | — | — | — | — |
| | | Diethanolamine | — | — | — | — | — | — |
| | Low molecular-weight alcohol | Glycerine | — | — | — | — | — | — |
| Open-cell blowing agent(f) | Open-cell blowing agent(f)(1) | Average functionality 3 Hydroxyl number 49.9(mgKOH/g) oxyethylene unit content 75(%) | — | — | — | — | — | — |
| | Open-cell blowing agent(f)(2) | Average functionality 2 Hydroxyl number 125.0(mgKOH/g) oxyethlene unit content 85(%) | — | — | — | — | — | — |
| | Open-cell blowing agent(f)(3) | Average functionality 4 Hydroxyl number 125.1(mgKOH/g) oxyethylene unit content 91(%) | — | — | — | — | — | — |
| | Silicone foam stabilizer 1 | DC5609 | 1.00 | 1.00 | 1.01 | 1.00 | 0.98 | 1.00 |
| | Silicone foam stabilizer 2 | F-242T | — | — | — | — | — | — |
| | Antioxidant 1 | IRGANOX1135 | 0.31 | 0.32 | 0.30 | 0.30 | 0.30 | 0.30 |
| | Antioxidant 2 | JP-308E | 1.00 | 0.99 | 1.00 | 1.01 | 1.00 | 0.99 |
| | Ultraviolet absorber | TINUVIN 571 | 0.60 | 0.60 | 0.60 | 0.60 | 0.60 | 0.60 |
| | Light stabilizer | TINUVIN 765 | 0.60 | 0.60 | 0.60 | 0.61 | 0.60 | 0.60 |
| Evaluation | ①Presence of Absence of Shrinkage | | Absent | Absent | Absent | Absent | Absent | Absent |
| | ②Apparent core density | (kg/m³) | 52.1 | 54.2 | 55.3 | 53.2 | 55.2 | 56.2 |
| | ③Resilience by ball rebound | (%) | 7 | 6 | 6 | 6 | 5 | 5 |
| | ④Air flow value | (ml/cm²/sec) | 84 | 130 | 109 | 75 | 105 | 98 |
| | ⑤Resistance to UV discoloration | Δb before and after UV irradiation | 10.2 | 10.5 | 10.7 | 10.3 | 10.5 | 10.7 |
| | ⑥Number of the cells | (Number/cm²) | 234 | 256 | 248 | 246 | 265 | 264 |

TABLE 2

| | | | Ex. 7 | Ex. 8 | Ex. 9 |
|---|---|---|---|---|---|
| Polyisocyanate (a) | Polyisocyanate (a)(1-1) | 1,4-BIC, trans/cis ratio = 86/14 | — | — | — |
| | Polyisocyanate (a)(1-2) | 1,4-BIC, trans/cis radio = 70/30 | — | — | — |
| | Polyisocyanate (a)(1-3) | 1,4-BIC, trans/cis ratio = 93/7 | — | — | — |
| | Polyisocyanate | 1,4-BIC, trans/cis | — | — | — |

TABLE 2-continued

| | | | | | |
|---|---|---|---|---|---|
| | (a)(1-4) | ratio = 98/2 | | | |
| | Polyisocyanate (a)(2) | 1,3-BIC | — | — | — |
| | Polyisocyanate (a)(3) | 1,4-BIC*[1]/XDI(60/40) | 51.58 | — | — |
| | Polyisocyanate (a)(4) | 1,4-BIC*[1]/1,3-BIC(60/40) | — | 52.13 | — |
| | Polyisocyanate (a)(5) | 1,4-BIC*[1]/IPDI(60/40) | — | — | 55.28 |
| | Polyisocyanate (a)(6) | TDI | — | — | — |
| | Polyisocyanate (a)(7) | HDI-1/HDI-2(85/15) | — | — | — |
| | Isocyanate index | (NCO concentration/OH concentration) × 100 | 70 | 70 | 70 |
| Polyol (b) | Polyol (b-1)(1) | Hydroxyl number 34.0(mgKOH/g) oxyethylene unit content 0(%) | 20.01 | 20.01 | 20.02 |
| | Polyol (b-1)(2) | Hydroxyl number 33.8(mgKOH/g) oxyethylene unit content 0(%) | — | — | — |
| | Polyol (b-2) | Hydroxyl number 180.2(mgKOH/g) oxyethylene unit content 18(%) | 80.01 | 80.03 | 80.10 |
| Catalyst (c) | Amine catalyst 1 | 33LV | 0.50 | 0.50 | 0.50 |
| | Amine catalyst 2 | ET | 0.50 | 0.50 | 0.51 |
| | Organic metal catalyst 1 | UL-28 | 0.15 | 0.15 | 0.15 |
| | Organic metal catalyst 2 | T-9 | — | — | — |
| Blowing agent(d) | Ion exchange water | | 3.00 | 2.98 | 3.00 |
| Cross-linking agent(e) | Alkanolamine | Triethanol amine | 8.00 | 8.02 | 8.01 |
| | | Triisopropanolamine | — | — | — |
| | | Diethanolamine | — | — | — |
| | Low molecular-weight alcohol | Glycerine | — | — | — |
| Open-cell blowing agent(f) | Open-cell blowing agent(f)(1) | Average functionality 3 Hydroxyl number 49.9(mgKOH/g) oxyethylene unit content 75(%) | — | — | — |
| | Open-cell blowing agent(f)(2) | Average functionality 2 Hydroxyl number 125.0(mgKOH/g) oxyethylene unit content 85(%) | — | — | — |
| | Open-cell blowing agent(f)(3) | Average functionality 4 Hydroxyl number 125.1(mgKOH/g) oxyethylene unit content 91(%) | — | — | — |
| | Silicone foam stabilizer 1 | DC5609 | 1.00 | 1.00 | 0.99 |
| | Silicone foam stabilizer 2 | F-242T | — | — | — |
| | Antioxidant 1 | IRGANOX1135 | 0.31 | 0.30 | 0.30 |
| | Antioxidant 2 | JP-308E | 1.00 | 1.00 | 1.00 |
| | Ultraviolet absorber | TINUVIN 571 | 0.60 | 0.60 | 0.60 |
| | Light stabilizer | TINUVIN 765 | 0.61 | 0.60 | 0.60 |
| Evaluation | ①Presence of Absence of Shrinkage | | Absent | Absent | Absent |
| | ②Apparent core density | (kg/m$^3$) | 54.2 | 53.2 | 52.8 |
| | ③Resilience by ball rebound | (%) | 6 | 6 | 6 |
| | ④Air flow value | (ml/cm$^2$/sec) | 88 | 92 | 72 |
| | ⑤Resistance to UV discoloration | Δb before and after UV irradiation | 13.2 | 10.3 | 10.5 |
| | ⑥Number of the cells | (Number/cm$^2$) | 251 | 245 | 229 |

TABLE 2-continued

|  |  |  | Ex. 10 | Ex. 11 | Ex. 12 |
|---|---|---|---|---|---|
| Polyisocyanate (a) | Polyisocyanate (a)(1-1) | 1,4-BIC, trans/cis ratio = 86/14 | 46.7 | 52.27 | — |
|  | Polyisocyanate (a)(1-2) | 1,4-BIC, trans/cis radio = 70/30 | — | — | — |
|  | Polyisocyanate (a)(1-3) | 1,4-BIC, trans/cis ratio = 93/7 | — | — | — |
|  | Polyisocyanate (a)(1-4) | 1,4-BIC, trans/cis ratio = 98/2 | — | — | — |
|  | Polyisocyanate (a)(2) | 1,3-BIC | — | — | — |
|  | Polyisocyanate (a)(3) | 1,4-BIC*¹/XDI(60/40) | — | — | 51.56 |
|  | Polyisocyanate (a)(4) | 1,4-BIC*¹/1,3-BIC(60/40) | — | — | — |
|  | Polyisocyanate (a)(5) | 1,4-BIC*¹/IPDI(60/40) | — | — | — |
|  | Polyisocyanate (a)(6) | TDI | — | — | — |
|  | Polyisocyanate (a)(7) | HDI-1/HDI-2(85/15) | — | — | — |
|  | Isocyanate index | (NCO concentration/OH concentration) × 100 | 70 | 70 | 70 |
| Polyol (b) | Polyol (b-1)(1) | Hydroxyl number 34.0(mgKOH/g) oxyethylene unit content 0(%) | 20.00 | — | — |
|  | Polyol (b-1)(2) | Hydroxyl number 33.8(mgKOH/g) oxyethylene unit content 0(%) | — | 20.00 | 20.00 |
|  | Polyol (b-2) | Hydroxyl number 180.2(mgKOH/g) oxyethylene unit content 18(%) | 80.00 | 79.98 | 80.04 |
| Catalyst (c) | Amine catalyst 1 | 33LV | 0.51 | 0.50 | 0.48 |
|  | Amine catalyst 2 | ET | 0.49 | 0.49 | 0.50 |
|  | Organic metal catalyst 1 | UL-28 | 0.15 | 0.15 | 0.15 |
|  | Organic metal catalyst 2 | T-9 | — | — | — |
| Blowing agent(d) | Ion exchange water |  | 2.99 | 3.01 | 3.00 |
| Cross-linking agent(e) | Alkanolamine | Triethanol amine | 4.00 | 7.99 | 8.00 |
|  |  | Triisopropanolamine | — | — | — |
|  |  | Diethanolamine | — | — | — |
|  | Low molecular-weight alcohol | Glycerine | — | — | — |
| Open-cell blowing agent(f) | Open-cell blowing agent(f)(1) | Average functionality3 Hydroxyl number 49.9(mgKOH/g) oxyethylene unit content 75(%) | — | — | — |
|  | Open-cell blowing agent(f)(2) | Average functionality2 Hydroxyl number 125.0(mgKOH/g) oxyethylene unit content 85(%) | — | — | — |
|  | Open-cell blowing agent(f)(3) | Average functionality4 Hydroxyl number 125.1(mgKOH/g) oxyethylene unit content 91(%) | — | — | — |
|  | Silicone foam stabilizer 1 | DC5609 | 1.00 | 1.01 | 1.00 |
|  | Silicone foam stabilizer 2 | F-242T | — | — | — |
|  | Antioxidant 1 | IRGANOX1135 | 0.32 | 0.32 | 0.30 |
|  | Antioxidant 2 | JP-308E | 0.99 | 1.00 | 1.00 |
|  | Ultraviolet absorber | TINUVIN 571 | 0.60 | 0.60 | 0.60 |
|  | Light stabilizer | TINUVIN 765 | 0.60 | 0.61 | 0.60 |
| Evaluation | ①Presence of Absence of Shrinkage |  | Absent | Absent | Absent |
|  | ②Apparent core density | (kg/m³) | 53.8 | 67.2 | 68.4 |
|  | ③Resilience by ball rebound | (%) | 10 | 8 | 8 |
|  | ④Air flow value | (ml/cm²/sec) | 95 | 55 | 45 |

TABLE 2-continued

| | | | | | |
|---|---|---|---|---|---|
| ⑤Resistance to UV discoloration | Δb before and after UV irradiation | | 9.7 | 10.4 | 13.3 |
| ⑥Number of the cells | (Number/cm²) | | 259 | 194 | 216 |

*¹trans/cis ratio = 86/14

TABLE 3

| | | | Comp. Ex. 1 | Comp. Ex. 2 | Comp. Ex. 3 | Comp. Ex. 4 |
|---|---|---|---|---|---|---|
| Polyisocyanate (a) | Polyisocyanate (a)(1-1) | 1,4-BIC, trans/cis ratio = 86/14 | 55.31 | 48.75 | — | — |
| | Polyisocyanate (a)(1-2) | 1,4-BIC, trans/cis ratio = 70/30 | — | — | — | — |
| | Polyisocyanate (a)(1-3) | 1,4-BIC, trans/cis ratio = 93/7 | — | — | — | — |
| | Polyisocyanate (a)(1-4) | 1,4-BIC, trans/cis ratio = 98/2 | — | — | — | — |
| | Polyisocyanate (a)(2) | 1,3-BIC | — | — | — | — |
| | Polyisocyanate (a)(3) | 1,4-BIC*¹/XDI(60/40) | — | — | — | — |
| | Polyisocyanate (a)(4) | 1,4-BIC*¹/1,3-BIC(60/40) | — | — | — | — |
| | Polyisocyanate (a)(5) | 1,4-BIC*¹/TPDI(60/40) | — | — | — | — |
| | Polyisocyanate (a)(6) | TDI | — | — | 30.00 | — |
| | Polyisocyanate (a)(7) | HDI-1/HDI-2(85/15) | — | — | — | 115.92 |
| | Isocyanate index | (NCO concentration/OH concentration) × 100 | 70 | 70 | 70 | 70 |
| Polyol (b) | Polyol (b-1)(1) | Hydroxyl number 34.0(mgKOH/g) oxyethylene unit content 0(%) | 2.98 | 40.01 | 20.03 | 20.04 |
| | Polyol (b-1)(2) | Hydroxyl number 33.8(mgKOH/g) oxyethylene unit content 0(%) | — | — | — | — |
| | Polyol (b-2) | Hydroxyl number 180.2(mgKOH/g) oxyethylene unit content 18(%) | 96.98 | 59.99 | 80.03 | 80.01 |
| Catalyst (c) | Amine catalyst 1 | 33LV | 0.51 | 0.49 | — | 0.50 |
| | Amine catalyst 2 | ET | 0.50 | 0.50 | 0.30 | 0.50 |
| | Organic metal catalyst 1 | UL-28 | 0.15 | 0.15 | — | 0.15 |
| | Organic metal catalyst 2 | T-9 | — | — | 0.10 | — |
| Blowing agent(d) | | Ion exchange water | 3.01 | 3.01 | 1.50 | 3.00 |
| Cross-linking agent(e) | Alkanolamine | Triethanol amine | 8.00 | 8.01 | 2.00 | 8.00 |
| | | Triisopropanolamine | — | — | — | — |
| | | Diethanolamine | — | — | — | — |
| | Low molecular-weight alcohol | Glycerine | — | — | — | — |
| Open-cell blowing agent(f) | Open-cell blowing agent(f)(1) | Average functionality 3 Hydroxyl number 49.9(mgKOH/g) oxyethylene unit content 75(%) | — | — | — | — |
| | Open-cell blowing agent(f)(2) | Average functionality 2 Hydroxyl number 125.0(mgKOH/g) oxyethylene unit content 85(%) | — | — | — | — |
| | Open-cell blowing agent(f)(3) | Average functionality 4 Hydroxyl number 125.1(mgKOH/g) oxyethylene unit content 91(%) | — | — | — | — |
| | Silicone foam stabilizer 1 | DC5609 | 1.02 | 1.00 | | 1.00 |
| | Silicone foam stabilizer 2 | F-242T | | | 1.00 | |
| | Antioxidant1 | IRGANOX1135 | 0.30 | 0.32 | 0.30 | 0.30 |
| | Antioxidant2 | JP-308E | 1.00 | 1.01 | 1.01 | 1.00 |
| | Ultraviolet absorber | TINUVIN 571 | 0.60 | 0.60 | 0.60 | 0.60 |
| | Light stabilizer | TINUVIN 765 | 0.60 | 0.60 | 0.60 | 0.60 |
| Evaluation | ①Presence or Absence of Shrinkage | | Absent | Present | Absent | Absent |
| | ②Apparent core density | (kg/m³) | 53.8 | 54.8 | 52.2 | 55.0 |
| | ③Resilience by ball rebound | (%) | 9 | 15 | 5 | 7 |
| | ④Air flow value | (ml/cm²/sec) | 35 | 68 | 32 | 35 |
| | ⑤Resistance to UV discoloration | Δb before and after UV irradiation | 10.1 | 11.2 | 19.6 | 10.4 |
| | ⑥Number of the cells | (Number/cm²) | 63 | 296 | 260 | 185 |

*¹trans/cis ratio = 86/14

TABLE 4

| | | | Ex. 13 | Ex. 14 | Ex. 15 | Ex. 16 | Ex. 17 | Ex. 18 | Ex. 19 |
|---|---|---|---|---|---|---|---|---|---|
| Polyisocyanate (a) | Polyisocyanate (a)(1-1) | 1,4-BIC, trans/cis ratio = 85/14 | 54.12 | 52.06 | 48.72 | 45.77 | 43.32 | — | — |
| | Polyisocyanate (a)(1-2) | 1,4-BIC, trans/cis ratio = 70/30 | — | — | — | — | — | 52.06 | — |
| | Polyisocyanate (a)(1-3) | 1,4-BIC, trans/cis ratio = 93/7 | — | — | — | — | — | — | 52.24 |
| | Polyisocyanate (a)(1-4) | 1,4-BIC, trans/cis ratio = 98/2 | — | — | — | — | — | — | — |

TABLE 4-continued

| | | | | | | | | | |
|---|---|---|---|---|---|---|---|---|---|
| | Polyisocyanate (a)(2) | 1,3-BIC | — | — | — | — | — | — | — |
| | Polyisocyanate (a)(3) | 1,4-BIC*[1]/XDI(60/40) | — | — | — | — | — | — | — |
| | Polyisocyanate (a)(4) | 1,4-BIC*[1]/1,3-BIC(60/40) | — | — | — | — | — | — | — |
| | Polyisocyanate (a)(5) | 1,4-BIC*[1]/TPDI(60/40) | — | — | — | — | — | — | — |
| | Polyisocyanate (a)(6) | TDI | — | — | — | — | — | — | — |
| | Polyisocyanate (a)(7) | HDI-1/HDI-2(85/15) | — | — | — | — | — | — | — |
| | Isocyanate index | (NCO concentration/OH concentration) × 100 | 70 | 70 | 70 | 70 | 70 | 70 | 70 |
| Polyol (b) | Polyol (b-1)(1) | Hydroxyl number 34.0(mgKOH/g) oxyethylene unit content 0(%) | 20.00 | 20.02 | 20.01 | 20.00 | 20.03 | 20.01 | 20.02 |
| | Polyol (b-1)(2) | Hydroxyl number 33.8(mgKOH/g) oxyethylene unit content 0(%) | | | | | | | |
| | Polyol (b-2) | Hydroxyl number 180.2(mgKOH/g) Oxyethylene unit content 18(%) | 80.03 | 80.01 | 80.03 | 80.10 | 80.05 | 80.03 | 80.00 |
| Catalyst (c) | Amine catalyst 1 | 33LV | 0.51 | 0.50 | 0.50 | 0.50 | 0.49 | 0.50 | 0.49 |
| | Amine catalyst 2 | ET | 0.50 | 0.50 | 0.51 | 0.51 | 0.50 | 0.50 | 0.50 |
| | Organic metal catalyst 1 | UL-28 | 0.15 | 0.15 | 0.15 | 0.15 | 0.15 | 0.15 | 0.15 |
| | Organic metal catalyst 2 | T-9 | — | — | — | — | — | — | — |
| Blowing agent(d) | | Ion exchange water | 3.00 | 3.01 | 2.99 | 3.00 | 3.00 | 3.01 | 3.00 |
| Cross-linking agent(e) | Alkanolamine | Triethanol amine | — | — | — | — | — | 8.00 | 8.01 |
| | | Triisopropanolamine | 12.01 | 10.00 | 7.01 | 4.01 | 2.00 | — | — |
| | | Diethanolamine | — | — | — | — | — | — | — |
| | Low molecular-weight alcohol | Glycerine | — | — | — | — | — | — | — |
| Open-cell blowing agent(f) | Open-cell blowing agent(f)(1) | Average functionality Hydroxyl number 49.9(MgKOH/g) oxyethylene unit content 75(%) | — | — | — | — | — | — | — |
| | Open-cell blowing agent(f)(2) | Average functionality2 Hydroxyl number 125.0(mgKOH/g) oxyethylene unit content 85(%) | — | — | — | — | — | — | — |
| | Open-cell blowing agent(f)(3) | Average functionality4 Hydroxyl number 125.1(mgKOH/g) oxyethylene unit content 91(%) | — | — | — | — | — | — | — |
| | Silicone foam stabilizer 1 | DC5609 | 1.01 | 0.99 | 1.00 | 1.01 | 1.00 | 1.00 | 1.00 |
| | Silicone foam stabilizer 2 | F-242T | — | — | — | — | — | — | — |
| | Antioxidant 1 | IRGANOX1135 | 0.30 | 0.31 | 0.30 | 0.30 | 0.30 | 0.29 | 0.29 |
| | Antioxidant 2 | JP-308E | 1.00 | 1.00 | 1.00 | 1.00 | 1.01 | 1.00 | 1.00 |
| | Ultraviolet absorber | TINUVIN 571 | 0.61 | 0.60 | 0.60 | 0.60 | 0.61 | 0.60 | 0.60 |
| | Light stabilizer | TINUVIN 765 | 0.59 | 0.61 | 0.60 | 0.60 | 0.59 | 0.60 | 0.60 |
| Evaluation | ①Presence or Absence of Shrinkage | | Absent | Absent | Absent | Absent | Absent | Absent | Absent |
| | ②Apparent core density | (kg/m$^3$) | 52.8 | 54.1 | 55.1 | 56.2 | 60.2 | 51.0 | 55.0 |
| | ③Resilience by ball rebound | (%) | 5 | 6 | 8 | 10 | 1.1 | 8 | 6 |
| | ④Air flow value | (ml/cm$^2$/sec) | 135 | 128 | 105 | 90 | 75 | 55 | 140 |
| | ⑤Resistaisce to UV discoloration | Ab before and before and after UV irradiation | 14.8 | 9.5 | 6.8 | 3.5 | 2.0 | 10.1 | 10.3 |
| | ⑥Number of the cells | (Number/cm$^2$) | 256 | 242 | 247 | 252 | 265 | 273 | 250 |

| | | | Ex. 20 | Ex. 21 | Ex. 22 | Ex. 23 | Ex. 24 | Ex. 25 | Ex. 26 |
|---|---|---|---|---|---|---|---|---|---|
| Polyisocyanate (a) | Polyisocyanate (a)(1-1) | 1,4-BIC,trans/cis ratio = 86/14 | — | 50.91 | 53.62 | 47.94 | 52.31 | 52.60 | 52.67 |
| | Polyisocyanate (a)(1-2) | 1,4-BIC,trans/cis ratio = 70/30 | — | — | — | — | — | — | — |
| | Polyisocyanate (a)(1-3) | 1,4-BIC,trans/cis ratio = 93/7 | — | — | — | — | — | — | — |
| | Polyisocyanate (a)(1-4) | 1,4-BIC,trans/cis ratio = 98/2 | 52.23 | — | — | — | — | — | — |
| | Polyisocyanate (a)(2) | 1,3-BIC | — | — | — | — | — | — | — |
| | Polyisocyanate (a)(3) | 1,4-BIC*[1]/XDI(60/40) | — | — | — | — | — | — | — |
| | Polyisocyanate (a)(4) | 1,4-BIC*[1]/1,3-BIC(60/40) | — | — | — | — | — | — | — |
| | Polyisocyanate (a)(5) | 1,4-BIC*[1]/TPDI(60/40) | — | — | — | — | — | — | — |
| | Polyisocyanate (a)(6) | TDI | — | — | — | — | — | — | — |
| | Polyisocyanate (a)(7) | HDI-1/HDI-2(85/15) | — | — | — | — | — | — | — |
| | Isocyanate index | (NCO concentration/OH concentration) × 100 | 70 | 70 | 70 | 70 | 70 | 70 | 70 |
| Polyol (b) | Polyol (b-1)(1) | Hydroxyl number 34.0(mgKOH/g) oxyethylene unit content 0(%) | 20.00 | 20.01 | 20.00 | 20.03 | 20.01 | 20.03 | 20.01 |
| | Polyol (b-1)(2) | Hydroxyl number 33.8(mgKOH/g) oxyethylene unit content 0(%) | | | | | | | |
| | Polyol (b-2) | Hydroxyl number 180.2(mgKOH/g) oxyethylene unit content 18(%) | 80.01 | 80.03 | 80.10 | 80.05 | 79.99 | 79.99 | 80.00 |
| Catalyst (c) | Amine catalyst 1 | 33LV | 0.50 | 0.50 | 0.50 | 0.49 | 0.50 | 0.50 | 0.50 |
| | Amine catalyst 2 | ET | 0.51 | 0.51 | 0.51 | 0.50 | 0.49 | 0.51 | 0.49 |
| | Organic metal catalyst 1 | UL-28 | 0.15 | 0.15 | 0.15 | 0.15 | 0.15 | 0.15 | 0.15 |
| | Organic metal catalyst 2 | T-9 | — | — | — | — | — | — | — |

TABLE 4-continued

| | | | | | | | | | |
|---|---|---|---|---|---|---|---|---|---|
| Blowing agent(d) | | Ion exchange water | 2.99 | 2.99 | 3.00 | 3.00 | 2.99 | 2.99 | 2.99 |
| Cross-linking agent(e) | Alkanolamine | Triethanol amine | 7.99 | — | — | — | 8.01 | 8.01 | 8.00 |
| | | Triisopropanolamine | — | 7.01 | 4.01 | — | — | — | — |
| | | Diethanolamine | — | — | 3.00 | — | — | — | — |
| | Low molecular-weight alcohol | Glycerine | — | 1.00 | 1.00 | 3.00 | — | — | — |
| Open-cell blowing agent(f) | Open-cell blowing agent(f)(1) | Average functionality 3 Hydroxyl number 49.9(mgKOK/g) oxyethylene unit content 75(%) | — | — | — | — | 3.00 | — | — |
| | Open-cell blowing agent(f)(2) | Average functionality 2 Hydroxyl number 125.0(mgKOH/g) oxyethylene unit content 85(%) | — | — | — | — | — | 3.00 | — |
| | Open-cell blowing agent(f)(3) | Average functionality 4 Hydroxyl number 125.1(mgKOH/g) oxyethylene unit content 91(%) | — | — | — | — | — | — | 3.00 |
| | Silicone foam stabilizer 1 | DC5609 | 1.00 | 1.00 | 1.01 | 1.00 | 1.00 | 1.00 | 1.01 |
| | Silicone foam stabilizer 2 | F-242T | — | — | — | — | — | — | — |
| | Antioxidant 1 | IRGANOX1135 | 0.30 | 0.31 | 0.30 | 0.30 | 0.32 | 0.30 | 0.31 |
| | Antioxidant 2 | JP-308E | 1.00 | 1.00 | 1.00 | 1.03 | 0.99 | 1.00 | 0.99 |
| | Ultraviolet absorber | TINUVIN 571 | 0.60 | 0.60 | 0.59 | 0.61 | 0.60 | 0.60 | 0.61 |
| | Light stabilizer | TINUVIN 765 | 0.59 | 0.60 | 0.60 | 0.59 | 0.60 | 0.60 | 0.60 |
| Evaluation | ①Presence or Absence of Shrinkage | | Absent | Absent | Absent | Absent | Absent | Absent | Absent |
| | ②Apparent core density | (kg/m$^3$) | 55.8 | 49.0 | 52.0 | 68.0 | 56.2 | 56.1 | 57.6 |
| | ③Resilience by ball rebound | (%) | 5 | 7 | 9 | 12 | 6 | 6 | 6 |
| | ④Air flow value | (ml/cm$^2$/sec) | 150 | 135 | 130 | 45 | 155 | 160 | 162 |
| | ⑤Resistance to UV discoloration | Δb before and before and after UV irradiation | 10.5 | 5.7 | 2.5 | 1.7 | 10.6 | 10.2 | 10.3 |
| | ⑥Number of the cells | (Number/cm$^2$) | 218 | 237 | 227 | 155 | 227 | 235 | 223 |

*[1] trans/cis ratio = 86/14

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

A low-resilience polyurethane foam is used as a low-resilience elastomer for, for example, a shock absorbing material, a sound absorbing material, a vibration absorbing material, and a body pressure relieving material.

The invention claimed is:

1. A low-resilience polyurethane foam produced by allowing a low-resilience polyurethane foam composition containing polyisocyanate (a), polyol (b), catalyst (c), blowing agent (d) and cross-linking agent (e) to react,
wherein the polyisocyanate (a) comprises bis(isocyanatomethyl)cyclohexane, and the polyol (b) comprises,
5 to 30 mass % of polyoxypropylenepolyol (b-1) having an average functionality of 1.5 to 4.5 and a hydroxyl number of 20 to 70 mgKOH/g, and
70 to 95 mass % of polyol (b-2) having an average functionality of 1.5 to 4.5 and a hydroxyl number of 140 to 300 mgKOH/g,
the bis(isocyanatomethyl)cyclohexane contains cis-1,4-bis(isocyanatomethyl)cyclohexane and trans-1,4-bis(isocyanatomethyl)cyclohexane,
the bis(isocyanatomethyl)cyclohexane contains 80 mol % or more and 93 mol % or less of trans-1,4-bis(isocyanatomethyl)cyclohexane, and
an impact resilience determined in conformity with JIS K 6400 (2004) is 14% or less.

2. The low-resilience polyurethane foam according to claim 1, wherein the polyol (b-2) is polyoxyalkylene polyol comprising 10 mass % or more of oxyethylene unit and 90 mass % or less of oxypropylene unit.

3. The low-resilience polyurethane foam according to claim 1, wherein
the cross-linking agent (e) comprises alkanolamine.

4. The low-resilience polyurethane foam according to claim 3, wherein the alkanolamine comprises triisopropanolamine.

5. A method for producing a low-resilience polyurethane foam, the method comprising:
allowing a low-resilience polyurethane foam composition containing polyisocyanate (a), polyol (b), catalyst (c), blowing agent (d) and cross-linking agent (e) to react and foam, thereby producing a low-resilience polyurethane foam,
wherein the polyisocyanate (a) comprises bis(isocyanatomethyl)cyclohexane, and
the polyol (b) comprises,
5 to 30 mass % of polyoxypropylenepolyol (b-1) having an average functionality of 1.5 to 4.5 and a hydroxyl number of 20 to 70 mgKOH/g, and
70 to 95 mass % of polyol (b-2) having an average functionality of 1.5 to 4.5 and a hydroxyl number of 140 to 300 mgKOH/g,
the bis(isocyanatomethyl)cyclohexane contains 80 mol % or more and 93 mol % or less of trans-1,4-bis(isocyanatomethyl)cyclohexane, and
an impact resilience determined in conformity with JIS K 6400 (2004) is 14% or less.

* * * * *